(12) United States Patent
Meyers et al.

(10) Patent No.: US 12,270,347 B2
(45) Date of Patent: Apr. 8, 2025

(54) AIR TURBINE STARTER WITH DAMPING MEMBER

(71) Applicant: Unison Industries, LLC, Jacksonville, FL (US)

(72) Inventors: Shiloh Montegomery Meyers, Miamisburg, OH (US); Steven Ryan Kerley, Columbus, OH (US); Thomas V Ng, Lebanon, OH (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 18/306,644

(22) Filed: Apr. 25, 2023

(65) Prior Publication Data

US 2024/0360795 A1    Oct. 31, 2024

(51) Int. Cl.
*F02C 7/277* (2006.01)
(52) U.S. Cl.
CPC .......... *F02C 7/277* (2013.01); *F05D 2260/96* (2013.01)
(58) Field of Classification Search
CPC ...... F01D 11/12; F01D 11/122; F01D 11/125; F01D 19/00; F01D 21/04; F01D 21/045; F01D 21/006; F02C 7/268; F02C 7/275; F02C 7/277; F05D 2260/902
See application file for complete search history.

(56) References Cited

U.S. PATENT DOCUMENTS

| | | | |
|---|---|---|---|
| 2,987,296 A | 6/1961 | Ferguson, Jr. | |
| 3,048,364 A | 8/1962 | Troeger et al. | |
| 3,097,824 A | 7/1963 | Bunger et al. | |
| 3,261,228 A | 7/1966 | Rothman | |
| 4,509,896 A | 4/1985 | Linsker | |
| 4,914,906 A | 4/1990 | Burch | |
| 4,955,192 A | 9/1990 | Shekleton | |
| 5,203,160 A | 4/1993 | Ozono | |
| 6,533,541 B1 | 3/2003 | Farnsworth et al. | |
| 7,722,323 B2 | 5/2010 | Elsmark | |
| 8,376,700 B2 | 2/2013 | Le Saint | |
| 8,932,002 B2 | 1/2015 | Makulec et al. | |
| 10,316,756 B2 | 6/2019 | Gentile et al. | |
| 10,724,444 B2 | 7/2020 | Martinez et al. | |
| 11,624,323 B2 | 4/2023 | Chhabra | |
| 2001/0028845 A1* | 10/2001 | Langston | F01D 11/00 415/122.1 |
| 2006/0257253 A1* | 11/2006 | Dong | F02C 7/277 415/206 |
| 2012/0006035 A1 | 1/2012 | Makulec et al. | |
| 2012/0141258 A1* | 6/2012 | Makulec | F01D 21/045 415/182.1 |
| 2022/0065168 A1* | 3/2022 | Chhabra | F01D 21/02 |
| 2022/0243601 A1 | 8/2022 | Dhabade | |

FOREIGN PATENT DOCUMENTS

FR    2640684 B1    6/1990

* cited by examiner

*Primary Examiner* — Scott J Walthour
(74) *Attorney, Agent, or Firm* — McGarry Bair PC (57) ABSTRACT

An air turbine starter for starting an engine includes a starter housing having an inlet, an outlet, and a flow path extending between the inlet and the outlet. The air turbine starter includes a rotatable turbine member having a central hub defining a platform and a set of blades extending radially from the platform. The air turbine starter also includes a damping member.

16 Claims, 5 Drawing Sheets

AIR TURBINE STARTER WITH DAMPING MEMBER

TECHNICAL FIELD

The disclosure generally relates to a starter for a combustion engine, and more specifically to an air turbine starter having a rotatable turbine element.

BACKGROUND

A combustion engine can be engaged in regular operation to an air turbine starter (ATS). The ATS can be used to initiate the rotation of the combustion engine. The ATS is often mounted near the engine and can be coupled to a fluid source, such as compressed air, which impinges upon a turbine rotor in the ATS causing it to rotate at a relatively high rate of speed. The ATS includes an output shaft that is coupled to the turbine rotor, typically through a reducing gear box. The output shaft can be driven to cause a rotatable element of the combustion (e.g. a crankshaft) to begin rotating. Such rotation by the ATS continues until the combustion engine attains a self-sustaining rotational speed.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the present disclosure are broadly directed to an air turbine starter for starting an engine. For the purposes of illustration, one exemplary environment within which the air turbine starter can be utilized will be described in the form of a turbine engine. Such a turbine engine can be in the form of a gas turbine engine, a turboshaft, or a turbofan engine, in non-limiting examples. It will be understood, however, that the disclosure is not so limited and can have general applicability for any implementation of a driving mechanism that generates rotational motion at a driving output and provides the rotational motion to another piece of rotating equipment. For example, the disclosure can have applicability for a starter for other engines or vehicles, and may be used to provide benefits in industrial, commercial, and residential applications.

Air turbine starters (ATSs) can generally include a rotor with a rotatable turbine member having a central hub and a plurality of airfoils extending therefrom. During normal or standard operation of the air turbine starter, the rotor is driven by fluid flow through the turbine member and rotates in place with minimal or zero axial translation, wobbling, or the like. In certain circumstances, including but not limited to rotational imbalances in the turbine member, changes in a bearing assembly supporting the rotor, or certain applied loads on the ATS, the rotor can undergo additional position changes, including translational motion or rotational imbalance, within the ATS. Such position changes can lead to undesirable contact or collisions within the ATS, such as between the turbine member and interior portions of the ATS such as the starter housing, air flow ducts, or the like.

Braking elements or dampers can be provided adjacent the turbine member for absorbing mechanical energy and slowing rotation of the turbine member when a position change of the turbine member exceeds a predetermined threshold. Traditional dampers are typically oriented to confront the central hub. In such a case, such dampers are configured to apply braking forces near the rotational center of the turbine member where the applied torque has a small moment arm.

Aspects of the disclosure provide for an air turbine starter and damper assembly arranged to confront radially outer portions of the turbine member, such as the platform or blades. In some exemplary implementations, the damper assembly can form part of a flow path through the air turbine starter. The described aspects provide for a damper assembly that slows turbine rotation more quickly and efficiently compared to traditional braking elements or dampers.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction toward or away from a common center. For example, the term "radial" can refer to a direction extending perpendicularly from a center longitudinal axis of a component. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are provided for purposes of illustration only and the dimensions, positions, order and relative sizes reflected in the drawings attached hereto can vary.

Figure 1:
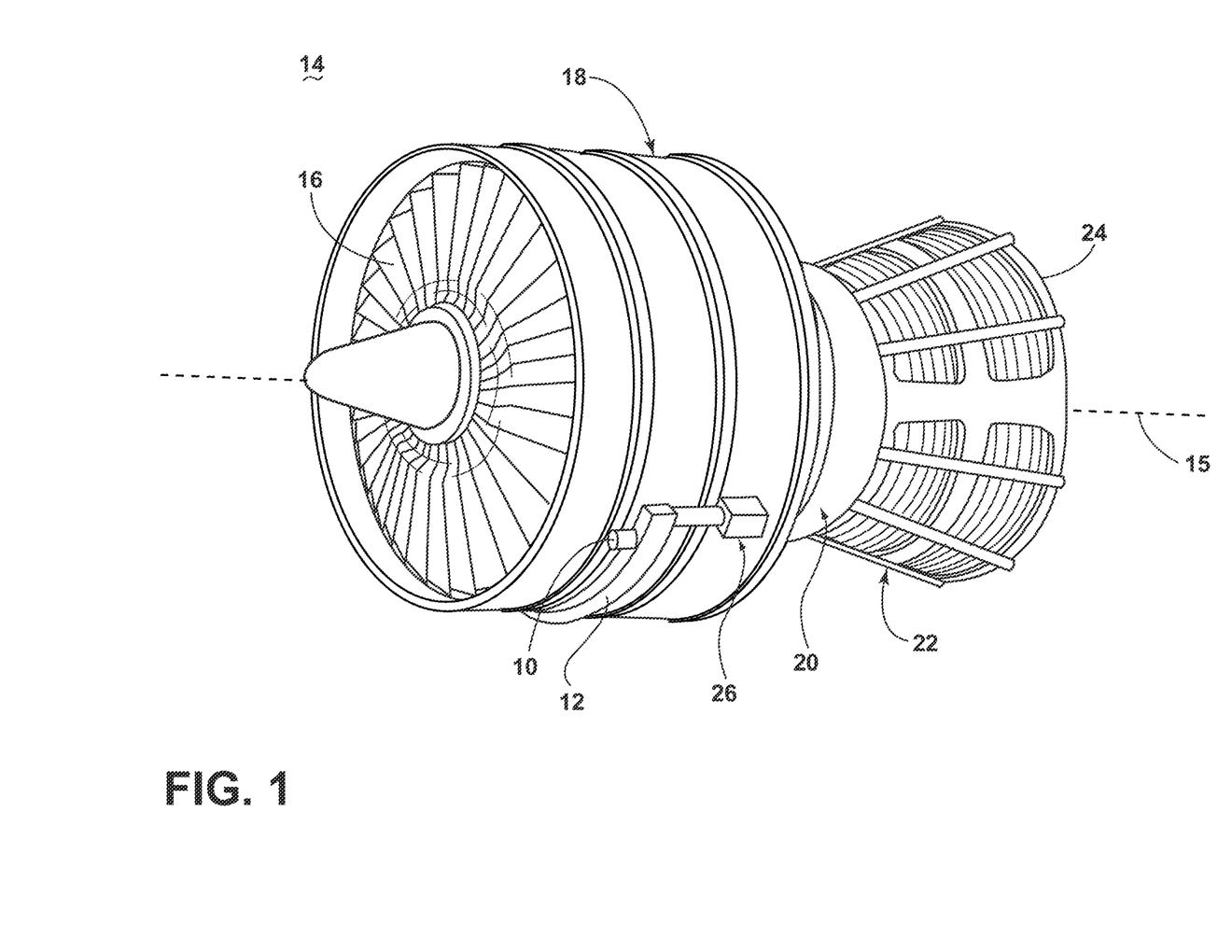
FIG. 1 is a perspective view of a turbine engine in accordance with various aspects described herein.

Referring to FIG. 1, an air turbine starter 10 (referred to herein as "ATS 10") and an accessory gear box 12 (referred to herein as "AGB 12") are schematically illustrated. The ATS 10 can be coupled to the AGB 12. In the exemplary implementation shown, the ATS 10 and the AGB 12 can each be mounted to a turbine engine 14, such as a gas turbine engine. Such an assembly is commonly referred to as an Integrated Starter/Generator Gearbox (ISGB). It is understood that aspects of the disclosure are not limited to ISGBs and can have general applicability to isolated air turbine starters.

The turbine engine 14 defines an engine axis 15 and includes an air intake with a fan 16 that supplies air to a high pressure compression region 18. The air intake with the fan 16 and the high pressure compression region 18 collectively are known as the "cold section" of the turbine engine 14. The cold section is located upstream of the combustion.

During operation of the turbine engine 14, the high pressure compression region 18 provides a combustion chamber 20 with high pressure air. In the combustion chamber 20, the high pressure air is mixed with fuel and combusted. Hot and pressurized combustion gases pass through a high pressure turbine region 22 and a low pressure turbine region 24 before exhausting from the turbine engine 14. As the combustion gases pass through the high pressure turbine region 22 and the low pressure turbine region 24, kinetic energy is extracted from the flow of the gases passing through the turbine engine 14. A shaft can connect the high pressure turbine region 22 to the high pressure compression 18 region to power the compression mechanism. The low pressure turbine can be coupled to the fan 16 of the air intake by way of a shaft to power the fan 16.

The AGB 12 can be coupled to the turbine engine 14 at either the high pressure turbine region 22 or the low pressure turbine region 24 by way of a mechanical power take-off 26. The mechanical power take-off 26 can contain multiple gears and components for mechanical coupling of the AGB 12 to the turbine engine 14. Under normal operating conditions, the power take-off 26 transmits power from the turbine engine 14 to the AGB 12 to power accessories of the aircraft, such as fuel pumps, electrical systems, or cabin environment controls, in non-limiting examples.

The ATS 10 can be mounted on the outside of the air intake region containing the fan 16, or on the core near the high-pressure compression region 18, in non-limiting examples.

Figure 2:
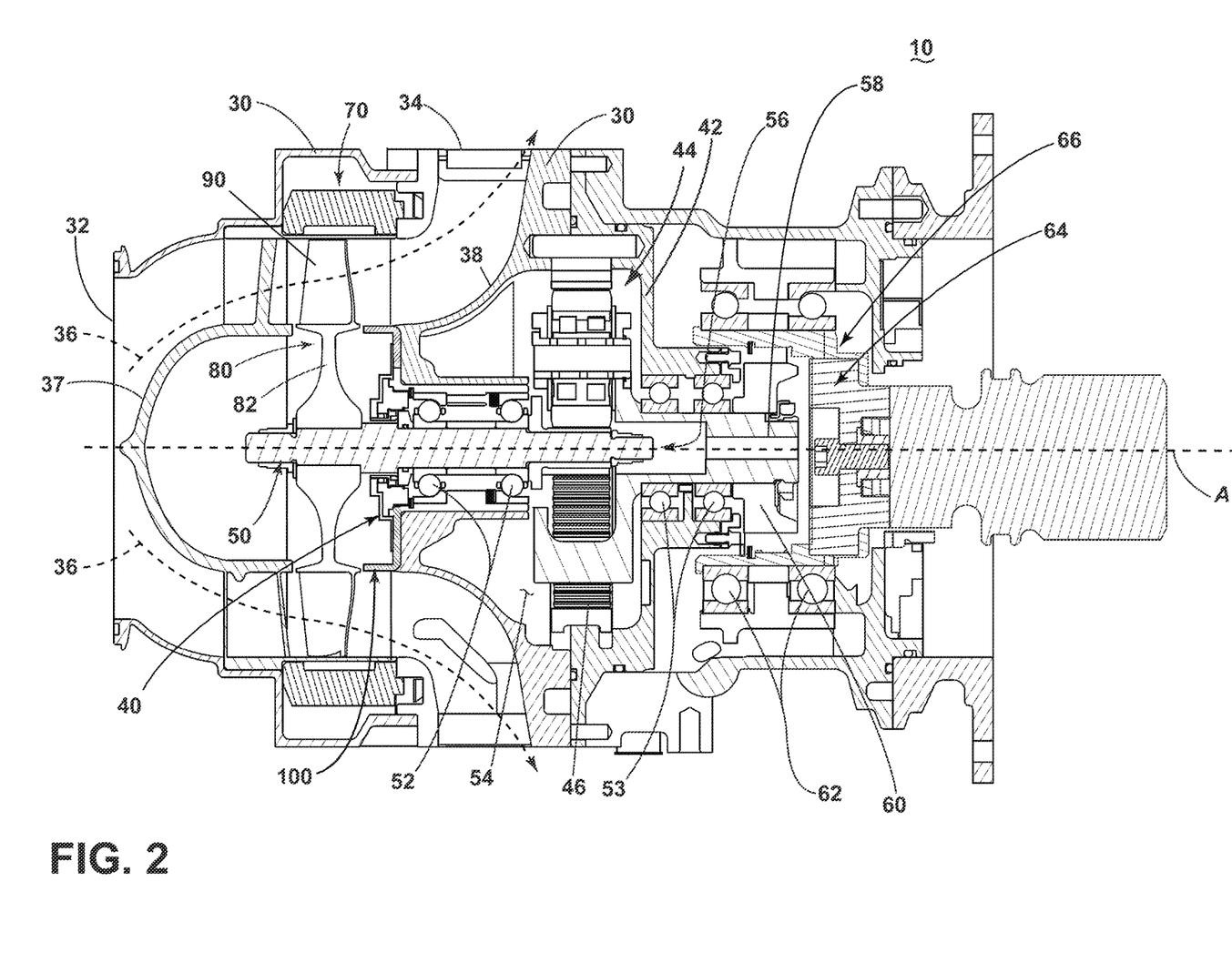
FIG. 2 is a cross-sectional view of an air turbine starter that can be utilized with the turbine engine of FIG. 1 in accordance with various aspects described herein.

Referring now to FIG. 2, the ATS 10 is shown in cross-section. The ATS 10 includes a starter housing 30 defining an axial direction A as shown. In some examples, the axial direction A can be parallel to the engine axis 15 (FIG. 1). The starter housing 30 also defines an inlet 32, an outlet 34, and a flow path 36 extending between the inlet 32 and outlet 34 for communicating a flow of fluid therethrough. Such fluid can be a gas or liquid, and can also include a pressurized fluid such as compressed air, in non-limiting examples. In addition, one or more annular ducts can be provided in the starter housing 30 and at least partially define the flow path 36. In the non-limiting example shown, an inlet duct 37 and an outlet duct 38 are provided in the starter housing 30, and each at least partially define the flow path 36. The inlet duct 37 can form the inlet 32, and the outlet duct 38 can form the outlet 34.

A rotatable turbine member 80 is located within the starter housing 30. The turbine member 80 includes a central hub 82 and a set of blades 90 extending radially therefrom. The set of blades 90 are disposed within the flow path 36 for rotatably extracting mechanical power from the flow of gas along the flow path 36. Further, while a single turbine member 80 is illustrated, it is contemplated that multiple turbine members 80 can be provided to form multiple turbine stages within the ATS 10.

A containment ring 70 can be provided surrounding the turbine member 80. The containment ring 70 can be configured to capture fragments or liberated portions of the turbine member 80 that may occur, thereby preventing fragments from entering the flow path 36.

A set of damping members 100 can be provided in the ATS 10. The set of damping members 100 can confront the turbine member 80 as shown. The set of damping members 100 can be configured to contact and slow the turbine member 80 in the event of a position change during operation. In addition, while the set of damping members 100 is illustrated downstream of the turbine member 80 with respect to the flow path 36, the disclosure is not so limited and the set of damping members 100 can also be positioned upstream of the turbine member 80, or radially outward from the turbine member 80, in non-limiting examples. It is also contemplated that other components of the ATS 10, including the containment ring 70, can be included in the set of damping members 100.

At least one seal 40 can be located within the starter housing 30. The seal 40 can be mounted to the starter housing 30, though this need not be the case. The seal 40 can at least partially fluidly seal the flow path 36 from other portions of the air turbine starter 10.

A gear box 42 is illustrated as mounted within the starter housing 30. A gear train 44 can be disposed within the gear box 42 and drivingly coupled with the turbine member 80. In the illustrated example, the gear train 44 includes a ring gear 46. It will be understood that the gear train 44 can include any suitable gear assembly including, but not limited to, a planetary gear assembly, a pinion gear assembly, or the like. A turbine shaft 50 couples the gear train 44 to the turbine member 80 allowing for the transfer of mechanical power to the gear train 44. The turbine shaft 50 is coupled to the gear train 44 and rotatably supported by a pair of turbine bearings 52. The gear train 44 is supported by a pair of carrier bearings 53.

A gear box interior 54 can be provided for containing a lubricant, including, but not limited to, grease or oil. The gear box interior 54 can provide lubrication and cooling to mechanical parts contained therein, such as the gear train 44, ring gear 46, turbine bearings 52, carrier bearings 53, or the like.

An aperture 56 is provided in the gear box 42. The turbine shaft 50 can extend through the aperture 56 and mesh with a carrier shaft 58 to which a clutch 60 is mounted and supported by a pair of spaced bearings 62. A drive shaft 64 extends from the gear box 42 and is coupled to the clutch 60 and additionally supported by the pair of spaced bearings 62. The drive shaft 64 is driven by the gear train 44 and coupled to the AGB 12 (FIG. 1), such that during a starting operation the drive shaft 64 provides a driving motion to the AGB 12.

The clutch 60 can be any type of shaft interface portion that forms a single rotatable shaft 66 comprising the turbine shaft 50, the carrier shaft 58, and the drive shaft 64. The shaft interface portion can be by any known method of coupling including, but not limited to, gears, splines, a clutch mechanism, or the like, or combinations thereof.

The ATS 10 can be formed by any materials and methods, including, but not limited to, die-casting of high strength and lightweight metals such as aluminum, stainless steel, iron, titanium, or the like. The starter housing 30 and the gear box 42 can be formed with a thickness sufficient to provide adequate mechanical rigidity without adding unnecessary weight to the ATS 10. Furthermore, the rotatable shaft 66 can be constructed by any materials and methods, including, but not limited to, extrusion or machining of high strength metal alloys such as those containing aluminum, iron, nickel, chromium, titanium, tungsten, vanadium, or molybdenum. The diameter of the turbine shaft 50, carrier shaft 58, and drive shaft 64 can be fixed or vary along the length of the rotatable shaft 66. In non-limiting examples, the diameter of the turbine shaft 50 can vary to accommodate different sizes of components coupled thereto, or to accommodate a variable rotor-to-stator spacing.

During a starting operation, fluid such as air supplied along the flow path 36 rotates the turbine member 80 for driving the rotation of the rotatable shaft 66. In some non-limiting examples, the fluid can be air supplied from a ground-operating air cart, an auxiliary power unit, or a cross-bleed start from an engine already operating. In this manner, the ATS 10 can form a driving mechanism for starting the turbine engine 14 (FIG. 1) via rotation of the rotatable shaft 66.

In addition, in certain conditions during a starting operation, portions of the ATS 10 can undergo a position change including, but not limited to, translational motion such as axial translation or radial translation, compound rotational motion such as shifting to rotate in a non-radial plane, or rotational imbalances such as wobbling or oscillation. In some instances, any or all of the turbine member 80, the turbine shaft 50, the carrier shaft 58, the drive shaft 64, or the rotatable shaft 66, in non-limiting examples, can undergo a position change. In one example, the turbine shaft 50 can undergo a position change by shifting or translating axially forward or aft during rotation. In another example, the turbine shaft 50 can undergo a position change by shifting into a new orientation within the ATS 10 such that the turbine member 80 rotates in a new rotational plane. In still another example, the turbine member 80 can undergo a position change by a rotational imbalance causing wobbling or oscillations. Regardless of the type of position change, it is contemplated that such position changes can cause the rotating turbine member 80 to contact interior portions of the ATS 10.

Figure 3:
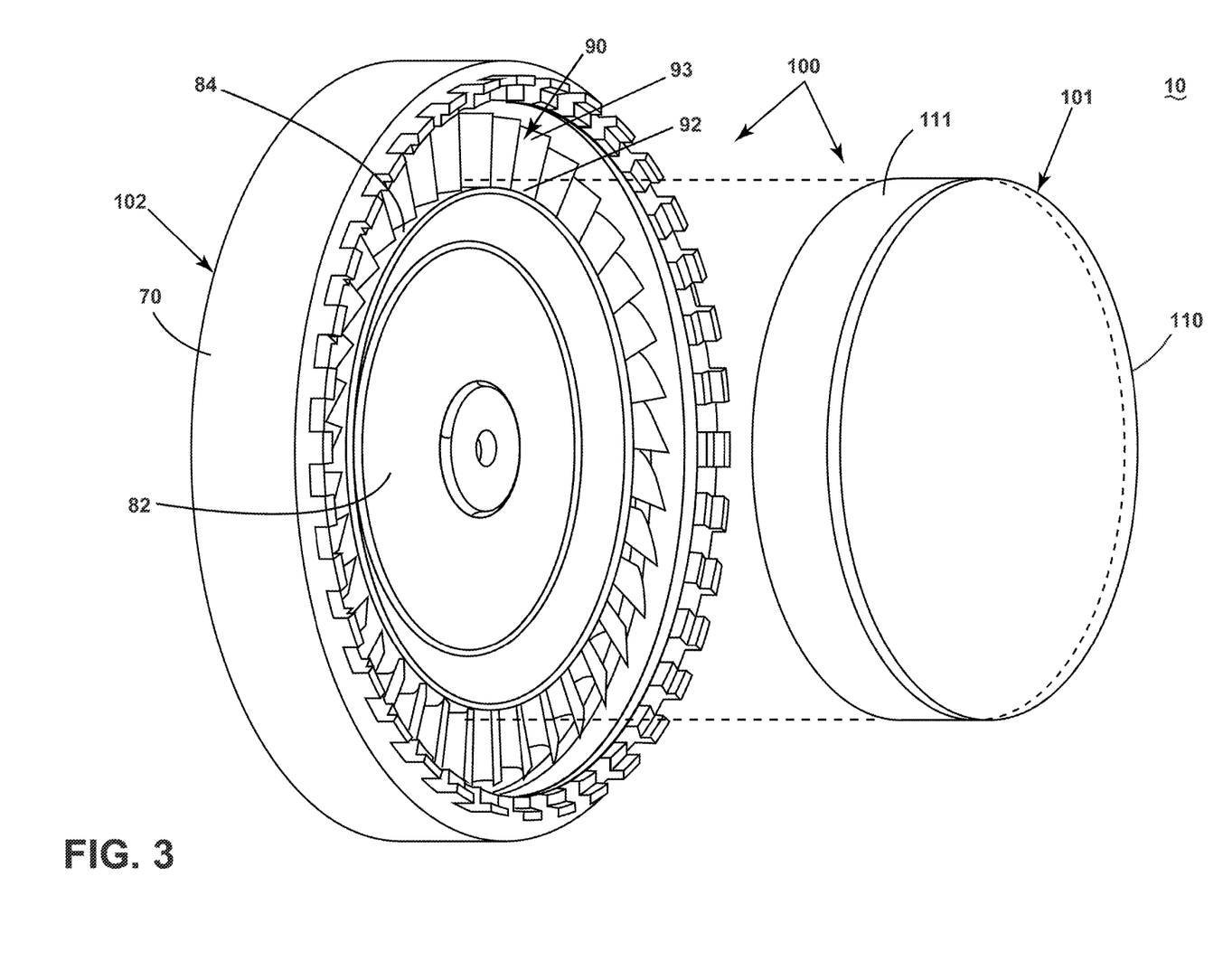
FIG. 3 is a schematic perspective view illustrating a turbine member and a set of damping members in the air turbine starter of FIG. 2 in accordance with various aspects described herein.

Turning to FIG. 3, the set of damping members 100, the turbine member 80, and the containment ring 70 are shown in isolation. The central hub 82 can define a platform 84. Each blade of the set of blades 90 extends radially from the platform 84 between a corresponding root 92 and tip 93. The containment ring 70 is positioned radially outward of the turbine member 80 and spaced from the tips 93.

The set of damping members 100 is schematically illustrated in FIG. 3, and it is understood that the set of damping members 100 can include damping members having any suitable form or geometric profile. In the non-limiting example shown, the set of damping members 100 includes a first damping member 101 and a second damping member 102. It is understood that any number of damping members can be provided, including only one. For example, the set of damping members 100 can have the first damping member 101 alone.

In the exemplary implementation shown, the first damping member 101 is in the form of a disk 110 with an axially-projecting rim 111, though this need not be the case. In some non-limiting examples, the first damping member 101 can include a continuous disk, or a set of circumferentially-arranged segments, or a non-continuous rim, or the like. Furthermore, while the rim 111 is illustrated as extending axially, it is contemplated that the rim 111 can extend at any angle, including at least partially radially in a non-limiting example. In still another example, the first damping member 101 can include multiple discrete rims 111 that can extend axially, or extend both axially and radially, in non-limiting examples. In addition, in the exemplary implementation shown, the second damping member 102 includes the containment ring 70. It is understood that other components of the ATS 10 can also define damping members, including portions of the housing 30 or inlet duct 37 (FIG. 2) in non-limiting examples.

The first damping member 101 and the second damping member 102 can be arranged to confront the turbine member 80. The first damping member 101 can axially confront at least one of the platform 84 or the set of blades 90. The second damping member 102 can radially confront the set of blades 90 as shown.

The first damping member 101 and the second damping member 102 can include suitable materials for removing energy from the rotating turbine member 80. In non-limiting examples, either or both of the first damping member 101 or the second damping member 102 can include metallic materials, composite materials, polymeric materials, abradable materials, or combinations thereof, including steel, aluminum, nickel, nickel alloy, ceramic, graphite, or silicon.

Figure 4:
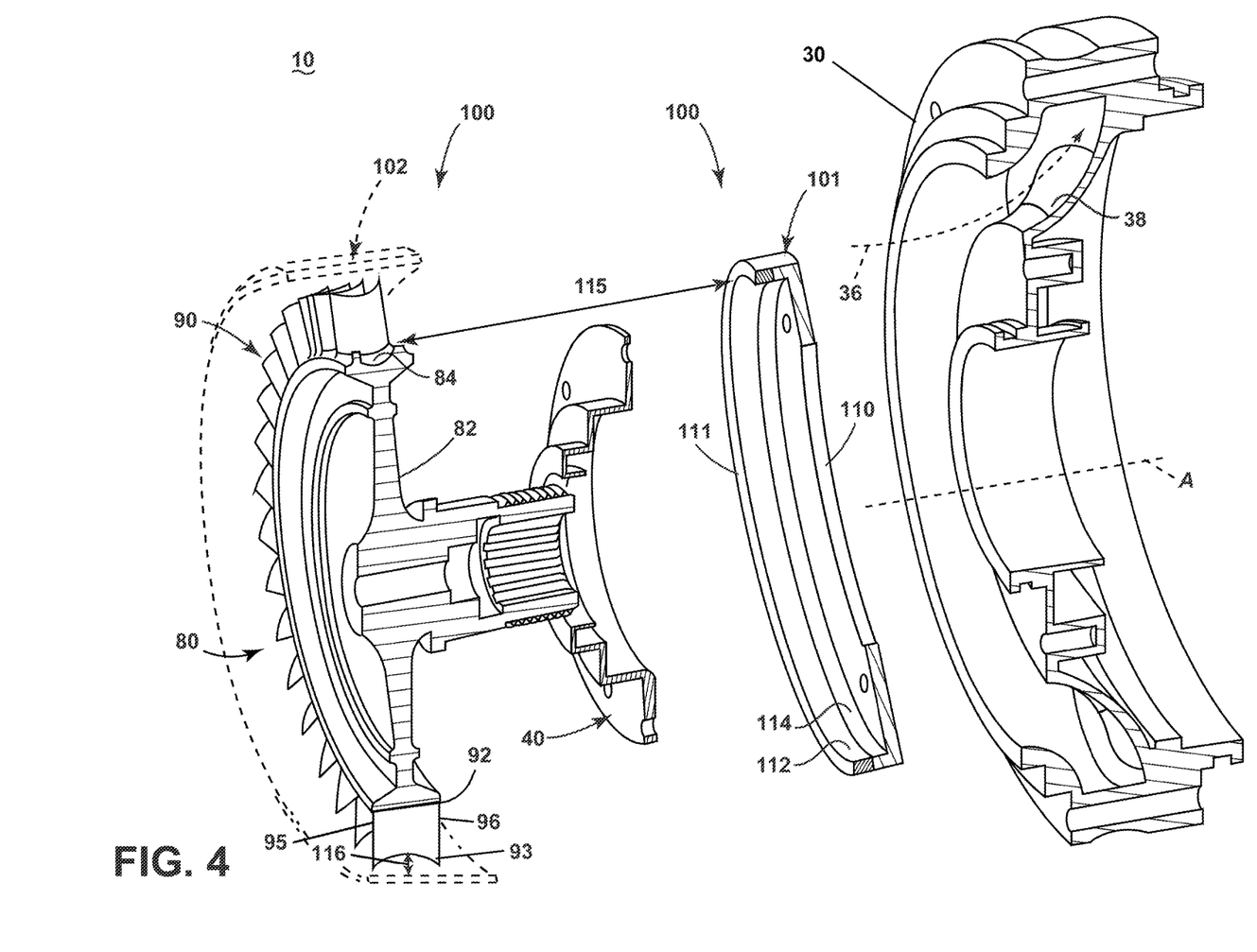
FIG. 4 is a partially-exploded cross-sectional view of a portion of the air turbine starter of FIG. 2.

Referring now to FIG. 4, a partially-exploded view of a portion of the ATS 10 illustrates the turbine member 80 arranged with the set of damping members 100 and a portion of the starter housing 30. The second damping member 102 is schematically illustrated in dashed line for visual clarity.

The turbine member 80 is shown with the central hub 82 and the set of blades 90. As described above, the blades of the set of blades 90 extend radially between corresponding roots 92 and tips 93. In addition, the blades of the set of blades 90 each extend axially between a corresponding leading edge 95 and a corresponding trailing edge 96.

The seal 40 is positioned adjacent to the turbine member 80. In the example shown, the seal 40 includes a bearing sleeve, though this need not be the case. The seal 40 can be formed of any suitable material including, but not limited to, steel, aluminum, nickel or nickel alloy, carbon, graphite, a polymeric material, a composite material, or the like, or combinations thereof.

The first damping member 101 can be located downstream of the turbine member 80. The first damping member 101 can include a wearable portion 112 and an axial stop portion 114. The wearable portion 112 can confront the turbine member 80. In addition, the wearable portion 112 can be radially aligned with the platform 84, though this need not be the case. Furthermore, in the non-limiting example shown, the axial stop portion 114 includes the disk 110. In another non-limiting example, the axial stop portion 114 can be provided with the rim 111 and coupled to the disk 110.

In addition, in the exemplary implementation shown, the first damping member 101 is configured to be mounted between the starter housing 30 and the seal 40 though this need not be the case. The set of damping members 100 can be coupled, mounted, or the like to any suitable portion of the ATS 10.

In some implementations, the wearable portion 112 and the axial stop portion 114 can be formed with the same material. For instance, in one non-limiting example the wearable portion 112 can include geometric features such as grooves, indents, dimpling, or the like for gradual wearing away while the axial stop portion 114 can be solid without such features for greater strength. Furthermore, in some implementations the wearable portion 112 can be formed of a first material and the axial stop portion 114 can include a second material different from the first material. In one exemplary implementation, the wearable portion 112 can include aluminum, composite alloy, or a polymeric material, and the axial stop portion 114 can include steel, nickel, or nickel alloy.

It is also contemplated that the axial stop portion 114 can include a hardened material compared to the wearable portion 112. As used herein, a "hardened material" will refer to a material having a greater material hardness, yield strength, true tensile strength, modulus of elasticity, bulk strength, shear strength, Mohs-scale hardness, or the like, when compared to a second material. For example, the axial stop portion 114 can have a greater material hardness compared to that of the wearable portion 112.

Still further, it is contemplated that the set of damping members 100 can also include a material having a high temperature capability. As used herein, "temperature capability" will refer to the highest operating temperature contemplated for use for a given material, wherein subjecting the material to temperatures higher than its temperature capability can cause effects such as oxidation, fatigue, plastic deformation, or melting of the material. For example, either or both of the first damping member 101 or the second damping member 102 can include steel, ceramic, silicon carbide, including steel coated with a ceramic outer layer or tip, or a silicon carbide coating, or a hard material cold spray coating, or an electrodeposited outer layer, or the like.

The outlet duct 38 is located downstream of the first damping member 101 as shown. It is further contemplated that the first damping member 101 can at least partially define the flow path 36 upstream of the outlet duct 38. In the non-limiting example shown, the first damping member 101 is in registry with the outlet duct 38, though this need not be the case. The first damping member 101 can also extend into the flow path 36, thereby narrowing the flow path 36 upstream of the outlet duct 38, in some implementations.

An operative axial spacing 115 is defined between the first damping member 101 and the turbine member 80 during standard rotation of the turbine member 80. More specifically, the operative axial spacing 115 can be defined between the wearable portion 112 and the turbine member 80. It is understood that in the partially-exploded view of FIG. 3, the operative axial spacing 115 is visually expanded compared to when the ATS 10 is assembled (e.g., as shown in FIG. 2).

In addition, an operative radial spacing 116 is defined between the second damping member 102 and the turbine member 80 when the ATS is assembled. More specifically, the operative radial spacing 116 can be defined between the containment ring 70 and the turbine member 80 during standard rotation of the turbine member 80.

During normal or standard operation of the ATS 10, the turbine member 80 does not contact the set of damping members 100, whereby each of the corresponding operative axial spacing 115 and operative radial spacing 116 is a value greater than 0 cm. In a non-limiting example during standard and balanced rotation of the turbine member 80, the turbine member 80 does not undergo any translational motion during rotation. In another example where a small position change is present in the turbine member 80, such as a small rotational imbalance or axial shift, the turbine member 80 can be translated by a small amount, such as between 0-0.5 cm in a non-limiting example. It is understood that under normal or standard operation, the operative axial spacing 115 and the operative radial spacing 116 each define a standard value representing a threshold or tolerance for position changes. For instance, either or both of the operative axial spacing 115 or the operative radial spacing 116 can define a standard value between 0.1-20 cm, including between 0.1-15 cm, or between 1-15 cm, or between 1-12 cm, or between 1-8 cm, or between 0.1-5 cm, or between 0.2-4 cm, or between 0.2-3 cm, or between 0.5-3 cm, in some non-limiting examples.

Figure 5:
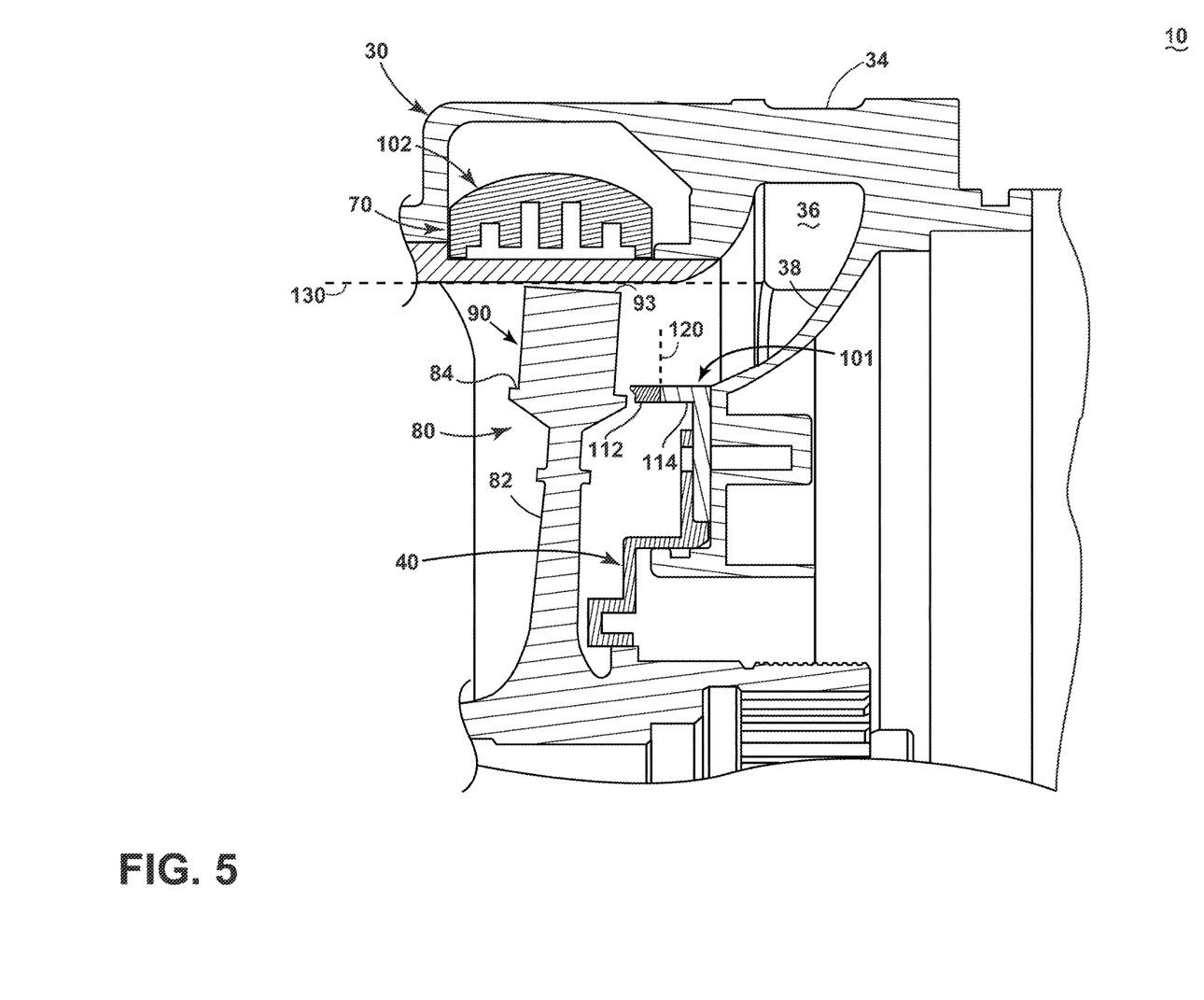
FIG. 5 is a cross-sectional view illustrating the air turbine starter of FIG. 2 during an example of operation.

Turning to FIG. 5, the turbine member 80 and the set of damping members 100 are illustrated in assembled positions within the ATS 10. In the illustrated example, the turbine member 80 is shown with a position change compared to normal or standard operation. Such a position change can arise from rotational imbalance of the turbine member 80, or translation of the turbine shaft 50, or the like, in non-limiting examples. In the example shown, the position change of the turbine member 80 includes at least an axial shift of the central hub 82 such that the operative axial spacing 115 (FIG. 4) is reduced from its standard value.

The first damping member 101 can define an axial boundary 120 confining the turbine member 80. More specifically, the axial stop portion 114 can define the axial boundary 120 as shown. In addition, the second damping member 102 can define a radial boundary 130 confining the turbine member 80 as shown. The axial boundary 120 can be spaced from the turbine member 80 by a distance of 1-15 cm in a non-limiting example. The radial boundary 130 can be spaced from the turbine member 80 by a distance of 0.1-3 cm in a non-limiting example. It is understood that the axial boundary 120 and the radial boundary 130 represent maximum possible translational-motion boundaries such that the turbine member 80 is confined therein.

During operation, the position change of the turbine member 80 can include axial or radial motion of the central hub 82 such that either or both of the operative axial spacing 115 or the operative radial spacing 116 (FIG. 4) are reduced from their standard values. In one example where the operative axial spacing 115 (FIG. 4) is reduced to 0 cm, the turbine member 80 contacts the first damping member 101 at the wearable portion 112. For example, the wearable portion 112 can contact the turbine member 80 at the platform 84. Such contact can include incident collision onto the wearable portion 112, or frictional sliding along the wearable portion 112, or combinations thereof. With repeated contact between the turbine member 80 and the wearable portion 112, the wearable portion 112 can absorb energy from the turbine member 80 by gradual release of material fragments, thereby undergoing a gradual reduction in thickness while remaining in position adjacent the axial stop portion 114. It is contemplated that the wearable portion 112 can form small-diameter fragments, such as 0.5-100 micrometers in a non-limiting example, whereby the released small-diameter fragments can smoothly enter the flow path 36 and exit through the outlet 34. In another example, the containment ring 70 can capture larger-diameter fragments, such as 1 mm or larger, that may be released from the wearable portion 112, thereby preventing such fragments from entering the outlet duct 38 or other portions of the ATS 10. In this manner, the wearable portion 112 can exert a braking torque that slows or stops rotation of the turbine member 80.

In a non-limiting example where the turbine member 80 continues to rotate with a position change, the wearable portion 112 can be worn away such that the turbine member 80 makes contact with the axial stop portion 114. In such a case, the axial stop portion 114 can have durability to remain in position during contact with the turbine member 80 such that the turbine member 80 is confined within the axial boundary 120. In this manner, the first damping member 101 prevents contact between the turbine member 80 and portions of the housing 30, such as the outlet duct 38, while also slowing or stopping rotation of the turbine member 80 by way of braking forces applied at the platform 84 or the set of blades 90.

It is also understood that the axial stop portion 114 additionally provides braking forces on the turbine member 80 for slowing rotation and axial translation. In this manner, the wearable portion 112 can define an axial extension to the operative axial spacing 115 (FIG. 4), wherein the position-shifted turbine member 80 can still operate beyond the operative axial spacing 115 while also being slowed by the wearable portion 112.

In addition, during operation, the turbine member 80 can also undergo a radial position change such that contact is made with the second damping member 102 and the resulting operative radial spacing 116 (FIG. 4) is reduced to 0 cm. Such contact also exerts a braking force on the turbine member 80, thereby slowing rotation and radial translation. It is contemplated that the second damping member 102 can remain in position to define the radial boundary 130 and thereby confine radial translation of the turbine member 80 to prevent contact with portions of the housing 30. In another non-limiting example, the second damping member 102 can also include a wearable portion, similar to the wearable portion 112, providing for extension of the operative radial spacing 116 (FIG. 4) in addition to a radial stop portion defining the radial boundary 130. In this manner, the set of damping members 100 can include one or multiple damping members slowing rotation and confining translational motion of the turbine member 80.

The described aspects of the present disclosure can provide for multiple benefits. The first damping member being arranged to contact radially outer portions of the turbine member, including at the platform, provides for a more effective braking force in a shorter time compared to traditional braking assemblies contacting central portions of the hub. Another benefit is found in the use of a wearable portion in the damping member, which provides for slowing a translated or out-of-balance turbine member from its highest speeds while preventing fragmentation of the blades by absorbing energy with wearable material. Another benefit is found in the use of an axial stop portion, which provides for axial confinement of the turbine member and also prevents undesired contact between the turbine member and the ATS housing. Still another benefit is found in the use of additional damping members, providing for even faster and more efficient arresting of motion compared to traditional braking systems. In addition, use of the containment ring as a damping member provides for additional energy absorption without causing fragmentation of the turbine member.

This written description uses examples to disclose aspects of the present subject matter, including the best mode, and also to enable any person skilled in the art to practice aspects of the present subject matter, including making and using any devices or systems and performing any incorporated methods. The patentable scope of the present subject matter is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An air turbine starter for starting an engine, comprising a starter housing having an inlet, an outlet, and a flow path extending between the inlet and the outlet; a rotatable turbine member comprising a central hub defining a platform, and a set of blades circumferentially spaced about the platform and extending radially from the platform into the flow path; and a damping member axially confronting at least one of the platform or the set of blades.

The air turbine starter of any preceding clause, wherein the damping member axially confronts the platform.

The air turbine starter of any preceding clause, wherein the damping member axially confronts the set of blades.

The air turbine starter of any preceding clause, wherein the damping member comprises a wearable portion coupled to an axial stop portion.

The air turbine starter of any preceding clause, wherein the wearable portion axially confronts at least one of the platform or the set of blades.

The air turbine starter of any preceding clause, wherein the axial stop portion defines an axial boundary confining the turbine member.

The air turbine starter of any preceding clause, wherein the wearable portion is radially aligned with the platform.

The air turbine starter of any preceding clause, wherein the wearable portion comprises a first material and the axial stop portion comprises a second material different from the first material.

The air turbine starter of any preceding clause, wherein the second material has a greater material hardness compared to the first material.

The air turbine starter of any preceding clause, wherein the second material has a greater material strength compared to the first material.

The air turbine starter of any preceding clause, wherein the wearable portion comprises at least one of aluminum, composite alloy, or a composite material.

The air turbine starter of any preceding clause, wherein the axial stop portion comprises at least one of steel, nickel, or nickel alloy.

The air turbine starter of any preceding clause, further comprising a seal located adjacent the turbine member and coupled to the damping member.

The air turbine starter of any preceding clause, further comprising a seal at least partially fluidly sealing the flow path.

The air turbine starter of any preceding clause, wherein the damping member at least partially defines the flow path.

The air turbine starter of any preceding clause, further comprising a second damping member including a containment ring positioned radially outward of the turbine member.

The air turbine starter of any preceding clause, wherein the second damping member defines a radial boundary confining the turbine member.

An air turbine starter for starting an engine, comprising: a starter housing having an inlet, an outlet, and a flow path extending between the inlet and the outlet; a rotatable turbine member comprising a central hub defining a platform, and a set of blades circumferentially spaced about the platform and extending radially from the platform into the flow path; and a set of damping members, with a damping member in the set of damping members comprising a wearable portion and an axial stop portion, with the wearable portion axially confronting at least one of the platform or the set of blades, and the axial stop portion defining an axial boundary confining the turbine member.

The air turbine starter of any preceding clause, wherein the wearable portion comprises a first material and the axial stop portion comprises a second material, with the second material having at least one of a larger material hardness or a larger material strength compared to the first material.

The air turbine starter of any preceding clause, wherein the wearable portion comprises at least one of aluminum, composite alloy, or a composite material, and wherein the axial stop portion comprises at least one of steel, nickel, or nickel alloy.

The air turbine starter of any preceding clause, further comprising an operative axial spacing defined between the wearable portion and the turbine member, wherein the operative axial spacing is between 0.1-3 cm during balanced rotation of the turbine member.

The air turbine starter of any preceding clause, further comprising a second damping member radially spaced from the set of blades and defining a radial boundary for the turbine member.

The air turbine starter of any preceding clause, wherein at least one of the first damping member or the second damping member comprises at least one of a metallic material, a composite material, a polymeric material, an abradable material, steel, aluminum, nickel, nickel alloy, ceramic, graphite, or silicon.

The air turbine starter of any preceding clause, wherein the axial boundary is spaced from the turbine member by a distance of 1-15 cm during balanced rotation of the turbine member.

The air turbine starter of any preceding clause, wherein the radial boundary is spaced from the turbine member by a distance of 0.1-3 cm during balanced rotation of the turbine member.

The air turbine starter of any preceding clause, wherein the second damping member comprises a containment ring surrounding the turbine member and defining the radial boundary.

The air turbine starter of any preceding clause, wherein the damping member at least partially defines the flow path.

An air turbine starter for starting an engine, comprising: a starter housing having an inlet, an outlet, and a flow path extending between the inlet and the outlet; a rotatable turbine member comprising a central hub defining a platform, and a set of blades circumferentially spaced about the platform and extending radially from the platform into the flow path; a first damping member comprising at least an axial stop portion confronting at least one of the platform or the set of blades and defining an axial boundary confining the turbine member; and a second damping member radially spaced from the set of blades and defining a radial boundary confining the turbine member.

The air turbine starter of any preceding clause, wherein the damping member is mounted between the seal and the starter housing.

The air turbine starter of any preceding clause, wherein the seal comprises a frangible material configured to fragment under an axially-applied force from the turbine member.

The air turbine starter of any preceding clause, wherein the seal comprises at least one of steel, aluminum, nickel or nickel alloy, carbon, graphite, a polymeric material, or a composite material.

The air turbine starter of any preceding clause, wherein the damping member comprises a disk with an axially-extending rim.

The air turbine starter of any preceding clause, wherein the damping member comprises one of a continuous rim, a non-continuous rim, or multiple discrete rims.

What is claimed is:

1. An air turbine starter for starting an engine, comprising:
   a starter housing having an inlet, an outlet, and a flow path extending between the inlet and the outlet;
   a rotatable turbine member comprising a central hub defining a platform, and a set of blades circumferentially spaced about the platform and extending radially from the platform into the flow path; and
   a damping member defining a body having a wearable portion and an axial stop, the axial stop projecting axially to the wearable portion and defining an axial boundary, and wherein the wearable portion is axially confronting at least one of the platform or the set of blades, wherein the wearable portion is located axially between the axial stop and the at least one of the platform or the set of blades, wherein the wearable portion comprises a first material and the axial stop portion comprises a second material different from the first material, wherein the axial stop of the body has at least one of a greater hardness or a greater strength than the wearable portion of the body and wherein the wearable portion is configured to exert a braking force.

2. An air turbine starter for starting an engine, comprising:
   a starter housing defining a housing inlet, a housing outlet, and a flow path extending between the housing inlet and the housing outlet;
   a rotatable turbine member comprising a central hub defining a platform, and a set of blades circumferentially spaced about the platform and extending radially from the platform into the flow path; and
   a set of damping members, with a damping member in the set of damping members comprising a disk with a rim located within the starter housing and wherein the disk forms an axial stop portion and the rim forms a wearable portion confronting at least one of the platform or the set of blades, the wearable portion located axially between the axial stop portion and the at least one of the platform or the set of blades, wherein the wearable portion comprises a first material and the axial stop portion comprises a second material different from the first material and wherein the axial stop portion has at least one of a greater hardness or a greater strength than the wearable portion and wherein the wearable portion is configured to exert a braking force.

3. The air turbine starter of claim 2, wherein the wearable portion is radially aligned with the platform.

4. The air turbine starter of claim 2, wherein the wearable portion comprises at least one of aluminum, composite alloy, or a composite material, and wherein the axial stop portion comprises at least one of steel, nickel, or nickel alloy.

5. The air turbine starter of claim 2, further comprising a seal and wherein the damping member is mounted between the starter housing and the seal.

6. The air turbine starter of claim 2, wherein the damping member at least partially defines the flow path.

7. The air turbine starter of claim 2, wherein the set of damping members further comprises a second damping member positioned radially outward of the rotatable turbine member.

8. The air turbine starter of claim 2, wherein the wearable portion comprises at least one of aluminum, composite alloy, or a composite material, and wherein the axial stop portion comprises at least one of steel, nickel, or nickel alloy.

9. The air turbine starter of claim 2, further comprising an operative axial spacing defined between the wearable portion and the rotatable turbine member, wherein the operative axial spacing is between 0.1-3 cm during balanced rotation of the rotatable turbine member during standard operation.

10. The air turbine starter of claim 2, wherein the set of damping members further comprises a second damping member radially spaced from the set of blades and defining a radial boundary for the rotatable turbine member.

11. The air turbine starter of claim 10, wherein at least one of the damping member or the second damping member comprises at least one of a metallic material, a composite material, a polymeric material, an abradable material, steel, aluminum, nickel, nickel alloy, ceramic, graphite, or silicon.

12. The air turbine starter of claim 10, wherein the axial stop portion is spaced from the rotatable turbine member by a distance of 1-15 cm during balanced rotation of the rotatable turbine member during standard operation.

13. The air turbine starter of claim 12, wherein the radial boundary is spaced from the rotatable turbine member by a distance of 0.1-3 cm during balanced rotation of the rotatable turbine member during standard operation.

14. The air turbine starter of claim 10, wherein the second damping member comprises a containment ring surrounding the rotatable turbine member and defining the radial boundary.

15. The air turbine starter of claim 2, wherein the wearable portion includes at least one of a groove, an indent, or dimpling to promote gradual wearing.

16. An air turbine starter for starting an engine, comprising:
- a starter housing defining a starter housing inlet, a starter housing outlet, and a flow path extending between the starter housing inlet and the starter housing outlet;
- a rotatable turbine member comprising a central hub defining a platform, and a set of blades circumferentially spaced about the platform and extending radially from the platform into the flow path;
- a first damping member comprising a disk with a rim located within the starter housing, wherein the disk forms an axial stop portion and the rim forms a wearable portion confronting at least one of the platform or the set of blades, the wearable portion located axially between the axial stop portion and the at least one of the platform or the set of blades, wherein the wearable portion comprises a first material and the axial stop portion comprises a second material different from the first material and wherein the axial stop portion has at least one of a greater hardness or a greater strength than the wearable portion; and
- a second damping member, including a containment ring located within the starter housing, the second damping member radially spaced from the set of blades and defining a radial boundary confining the rotatable turbine member.

* * * * *